United States Patent
Stockwell

[15] 3,677,137
[45] July 18, 1972

[54] REVERSIBLE DIFFERENTIAL CONTROL VALVE AND SYSTEMS

[72] Inventor: Orville E. Stockwell, 536 First Ave., Greybull, Wyo. 82426

[22] Filed: June 19, 1970

[21] Appl. No.: 47,831

[52] U.S. Cl. ..........................................91/6, 91/171, 91/412
[51] Int. Cl. ..................................F01b 25/04, F15b 15/22
[58] Field of Search ..........................................91/171, 6, 412

[56] References Cited

UNITED STATES PATENTS

| | | | |
|---|---|---|---|
| 2,764,869 | 10/1956 | Scherr | 91/171 |
| 3,348,810 | 10/1967 | Curron, Jr. | 91/171 |
| 3,364,820 | 1/1968 | Stockwell | 91/171 |

*Primary Examiner*—Paul E. Maslousky
*Attorney*—Clarence A. O'Brien and Harvey B. Jacobson

[57] ABSTRACT

Unequal loading of two or more fluid motor devices simultaneously imparting movement to a load, is sensed by torsional stress of a torque tube to actuate a differential valve assembly controlling flow of fluid between a pressure source and the fluid motor devices. A valve plunger actuated by the torque tube changes the flow paths within the body of the valve assembly under control of check valves to thereby compensate for unequal loading of the fluid motor devices.

22 Claims, 13 Drawing Figures

PATENTED JUL 18 1972 3,677,137

Orville E. Stockwell
INVENTOR.

BY Clarence A. O'Brien
and Harvey B. Jacobson
Attorneys

Orville E. Stockwell
INVENTOR.

BY Clarence A. O'Brien
and Harvey B. Jackson
Attorney.

Orville E. Stockwell
INVENTOR

BY Clarence A. O'Brien
and Harvey B. Jacobson
Attorneys

Orville E. Stockwell
INVENTOR

BY Clarence A. O'Brien
and Harvey B. Jacobson
Attorneys

REVERSIBLE DIFFERENTIAL CONTROL VALVE AND SYSTEMS

This invention relates to fluid power motor systems and more particularly to systems having differential load sensing and compensating means regulating movement of loads such as elevating platforms, truck dump bodies, tractor mounted loaders, bulldozers, etc.

Fluid control systems for operating a plurality of fluid motor devices such as hydraulic jacks or piston devices, are well known. In such systems, the load is connected to a plurality of the hydraulic jacks so that some synchronization is required in order to avoid tilting, twisting or other distortion of the load lifting member or the frame. In order to cope with this problem relatively complex synchronizing valves and valve systems are utilized. In spite thereof, such fluid synchronizing systems are often inadequate under all operating conditions. Further, special and different valving is required for different loading arrangements making the fluid system expensive and costly to repair.

It is therefore an important object of the present invention to provide a sensitive differential control valve assembly capable of being economically manufactured and utilized in different fluid load sensing systems to compensate for unequal loading of fluid motors. A further object is to provide differential load sensing means for different loading arrangements to be used with the differential control valve assembly.

In accordance with the present invention, fluid under pressure from a suitable source is supplied to a plurality of fluid operated motors, piston devices or hydraulic jacks through a differential control valve assembly that is mechanically actuated by a sensing arrangement in response to tilting, twisting or any undesired distortion of a load member being moved. The valve assembly includes a valve plunger actuated by the sensing system by means of which fluid flow paths within the valve body of the valve assembly are changed under control of a system of check valves in order to provide the desired compensating action. This differential control over the fluid operated devices is exercised by the control valve assembly during movement of the load member in either direction.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 11:
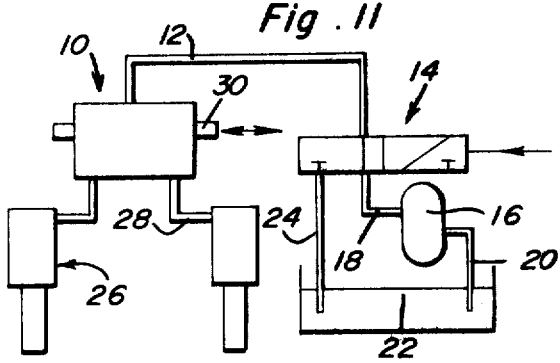
FIG. 11 is a simplified, fluid circuit diagram including the hydraulic reversible differential control valve assembly of the present invention.

Referring now to the drawings in detail, FIG. 11 shows a simplified fluid circuit with which a reversible differential control valve assembly 10 is associated in accordance with the present invention. A single fluid supply port associated with the reversible differential control valve assembly 10 is connected by fluid line 12 to a source of fluid under pressure through a selectively controlled directional control valve of any standard type 14. The pressure source may comprise a pump 16 having a fluid pressue output 18 connected to the directional control valve 14 and an intake 20 through which fluid is withdrawn from a fluid reservoir 22 to which the directional control valve 14 is also connected by the exhaust line 24. Thus, in one position of the directional control valve 14 as shown in FIG. 11, fluid under pressure is supplied through line 12 and the reversible differential control valve assembly 10 to a plurality of fluid operated devices, fluid motors or hydraulic jacks 26. In the illustrated embodiment, a pair of single action piston jacks 26 are shown connected to the load ports of the reversible differential control valve assembly 10 by fluid lines 28. Thus, in the position of the directional control valve 14 as shown in FIG. 11, fluid under pressure will be supplied to the hydraulic jacks 26 to cause extension of the piston rods therefrom. When the directional control valve 14 is displaced to its other operative position, fluid will be exhausted from the hydraulic jacks so as to cause retraction of the piston rods. Ordinarily, fluid flow to and from both hydraulic jacks is equal. However, because of unequal loading of the hydraulic jacks, there is a tendency for the jacks to undergo movement by different amounts or at different rates. This differential movement or uneven condition of the jacks is sensed by means to be described hereafter, thereby causing shift of a valve plunger 30 of the valve assembly 10 from a neutral position. When the valve plunger 30 is in a neutral position, bidirectional flow between all ports is permitted. When the valve plunger is shifted from its neutral position in either direction, reflecting an uneven condition, throttling and gradual cut-off of flow to one of the hydraulic jacks occurs as one compensating action while unidirectional cross-flow between the jacks is permitted in order to further compensate for the uneven condition. When the jacks are equalized as a result of this compensating action, the valve plunger 30 is restored to its neutral position. The foregoing action of the valve assembly 10 occurs regardless of the direction in which flow is conducted through the fluid line 12. Similar load compensating action may be applied to a fluid control system for double action piston jacks utilizing the differential control valve assembly 10 as will be hereafter discussed in greater detail.

Figure 4:
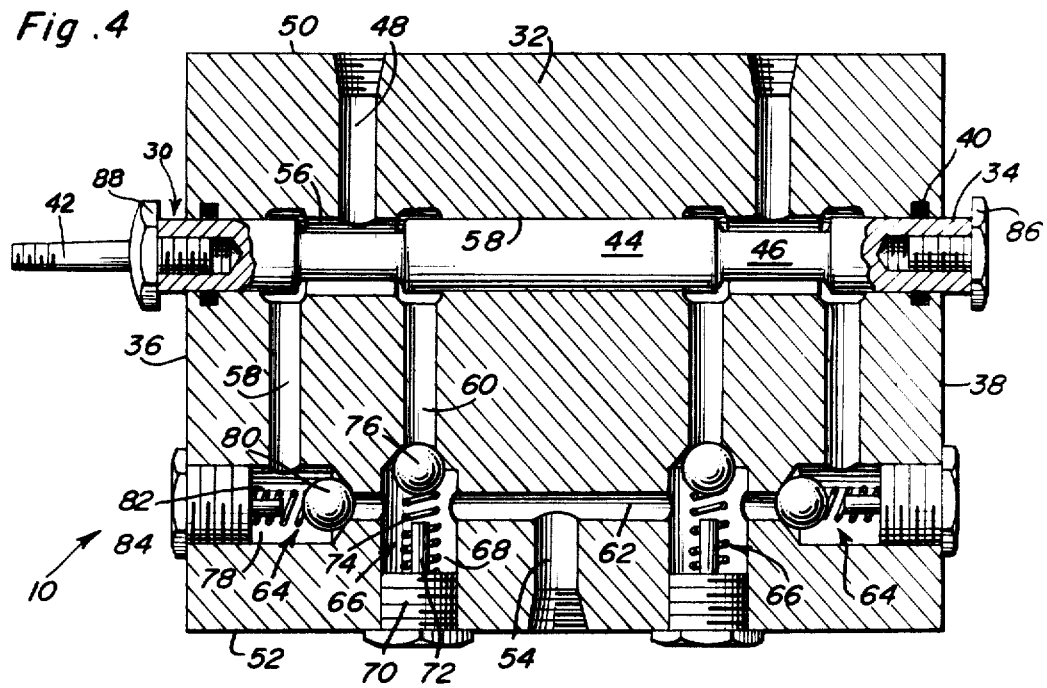
FIG. 4 is a sectional view through one form of reversible differential control valve assembly adapted to be utilized in the system illustrated in FIGS. 1-3.

FIG. 4 illustrates one embodiment of the differential control valve assembly 10. The valve assembly includes a valve body 32 within which the valve plunger 30 is slidably mounted. The valve plunger includes end land portions 34 which project through the ends 36 and 38 of the valve body in wiping engagement with the seals 40. The land portions 34 of the valve plunger are internally threaded for threaded reception of a connector 42 at one end of the valve plunger through which the sensing system may impart movement to the valve plunger 30 in either direction from the neutral position shown in FIG. 4. In the illustrated embodiment, the valve plunger 30 is also provided with an intermediate land 44 spaced from the end portions 34 by smaller diameter spool portions 46.

The valve body is provided with a pair of load ports 48 respectively connected by fluid lines to the fluid operated devices as aforementioned in connection with FIG. 11. The ports 48 are disposed on the side 50 of the valve body 32 opposite the side 52 through which a single supply port 54 extends for connection to the source of fluid. The load ports 48 establish communication with spaced valve cavities formed by the bore 56 through which the valve plunger 30 is slidably shifted. The valve cavities are disposed about the small diameter spool portions 46 of the valve plunger and each valve cavity extends axially between a pair of parallel passages or conduits 58 and 60 formed in the valve body in communication with the valve cavities in bore 56. Fluid communication is established between the parallel passages 58 and 60 and the control port 54 through connecting passage 62 and two pair of pressure responsive check valve assemblies 64 and 66 associated with the passages 58 and 60 on either side of the supply port 54.

The connecting passage 62 intersects valve chambers 68 on either side of the port 54 associated with the check valve assemblies 66. The valve chambers 68 are closed and sealed at the side 52 of the valve body by the threaded plugs 70 having pins 72 projecting into the valve chamber for positioning springs 74 biasing check elements 76 to the closed positions shown blocking flow in one direction through the associated passages 60. The check valve assemblies 64 on the other hand associated with the passages 58, include valve chambers 78 seating ball check elements 80 for blocking flow in one direction between the passages 58 and the connecting passage 62 under the bias of springs 82 positioned on the threaded plugs 84 sealing the valve chambers at the ends 36 and 38 of the valve body. Thus, the check valve assemblies 64 and 66 block flow through the associated passages 58 and 60 in opposite directions.

With the valve plunger 30 in the neutral position illustrated in FIG. 4, fluid flow under pressure from the supply port 54 will be conducted through connecting passage 62 and past the check valves 64 to both load ports 48 through passages 58 and valve cavities 56 surrounding the spool portions 46 of the valve plunger 30. Fluid flow in the other direction from the load ports 48 to the supply port 54 on the other hand, will be conducted along parallel paths which include the passages 60 past the check valves 66. Further, fluid flow may be conducted between the load ports 48 in the neutral position of the valve plunger 30. Thus, flow in both directions between all three ports 48 and 54 is accommodated, requiring only enough pressure to open the check valves against the bias of the associated springs.

In response to an uneven condition of the hydraulic jacks in the fluid system with which the reversible differential control valve assembly 10 is associated, the valve plunger 30 will be axially shifted in one direction or the other from its neutral position. The intermediate land 44 of the valve plunger will then block fluid communication between one of the load ports 48 and associated passage 60 while fluid communication between the other load port and the associated passage 58 will be blocked by one of the end land portions 34 of the valve plunger. Consider, for example, that the valve plunger 30 is shifted in a left hand direction as viewed in FIG. 4 to one of its load compensating positions wherein the stop head 86 abuts the end 38 of the valve body. The intermediate land 44 of the valve plunger will then block flow between the left hand port 48 and passage 60 as viewed in FIG. 4 while the right hand end portion 34 of the valve plunger will block flow between the right hand port 48 and right hand passage 58. Flow in one direction may then be conducted between the supply port 54 and the left hand load port 48 past check valve 64 in order to extend the piston rod of the hydraulic jack to which the left hand port 48 is connected for equalizing purposes. Fluid flow in the other direction will be conducted between the right hand load port 48 and the supply port 54 past the right hand check valve assembly 66 in order to permit retraction of the hydraulic jack connected to the right hand load port 48. Also, fluid cross-over flow may be conducted in one direction only from the right hand port 48 to the left hand port past the right hand check valve 66 and the left hand check valve 64. A reversal in flow direction between ports from that described can occur if the valve plunger 30 is shifted to its other load compensating position with the stop head 88 abutting the end 36 of the valve body.

Figure 5:
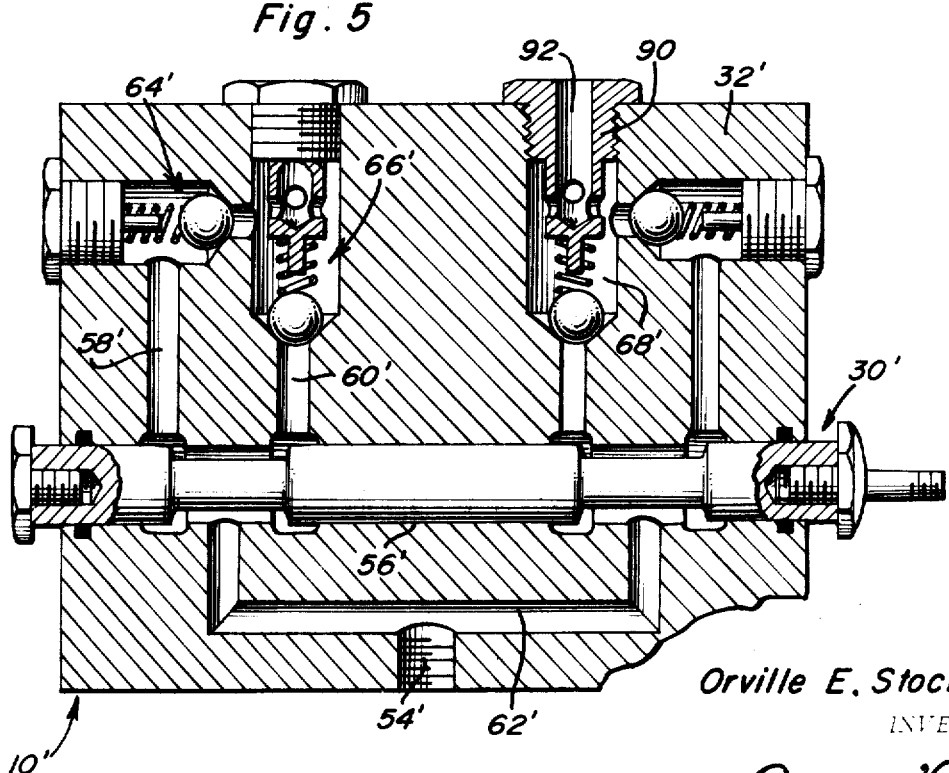
FIG. 5 is a sectional view through a second form of reversible differential control valve assembly.

The reversible differential control valve assembly 10' illustrated in FIG. 5 is basically the same as the valve assembly 10 shown in FIG. 4 except for a reversal in position of the supply and load ports. Thus, the supply port 54' communicates with the valve bore 56' through connecting passage 62'. The valve plunger 30' controls fluid communication between the connecting passage 62' and two pair of parallel conduit portions or passages 58' and 60'. A check valve assembly 64' is associated with each passage 58' while a check valve assembly 66' is associated with each passage 60'. The structure and action associated with the valve plunger 30' and the check valve assemblies 64' and 66' are substantially the same as described in connection with the valve plunger 30 and check valve assemblies 64 and 66 of the valve assembly 10, except that the check valve assemblies 66' are associated with load port fittings 90 threadedly mounted in the valve body 32'. The fittings 90 are formed with axial passages 92 constituting the load ports in fluid communication with the valve chambers 68' associated with the check valve assemblies 66'. Thus, the valve assembly 10' performs all of the functions described in connection with the valve assembly 10 in a similar manner.

The reversible differential control valve assembly 94 illustrated in FIG. 6, also performs the same functions described in connection with the reversible differential control valve assembly 10 illustrated in FIG. 4. This valve assembly includes a valve body 96 provided with a valve bore 98 through which a valve plunger 100 is axially shifted in order to differentially control flow of fluid to and from the load ports 102 in communication with the valve bore on a side of the valve body opposite the side through which a supply port 104 extends within an externally threaded fitting 106. The axial end portions 108 of the valve plunger 100 when displaced from the neutral position illustrated in FIG. 6, block one of the two parallel passages 110 in order to interrupt fluid communication with one of the load ports 102. An intermediate land portion 112 on the valve plunger when axially shifted in either direction from the neutral position illustrated, interrupts fluid communication between one of the load ports and a common passage 114 in the valve body as well as to block bidirectional crossflow between the ports 102 through the cavity 115.

Figure 6:
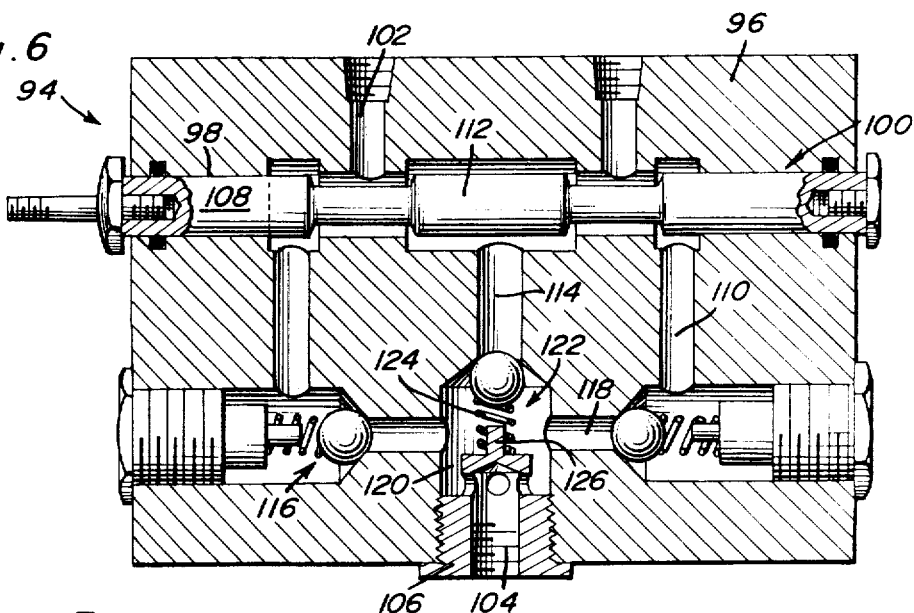
FIG. 6 is a sectional view through a third form of reversible differential control valve assembly.

A pair of oppositely directed check valve assemblies 116 control fluid flow between the passages 110 and a connecting passage 118 intersecting the valve chamber 120 associated with check valve assembly 122 which is biased by spring 124 to a seated position as illustrated in FIG. 6 blocking flow in one direction between the common passage 114 and the supply port 104 in communication with the valve chamber 120. The spring 124 is positioned within the valve chamber by a projection 126 on the fitting 106. The valve assembly 94 is hence similar to the valve assembly 10 of FIG. 4, except that the two passages 60 are replaced by the common passage 114 while the two check valve assemblies 66 associated with the passages 60 are replaced by a single check valve assembly 122.

Figure 7:
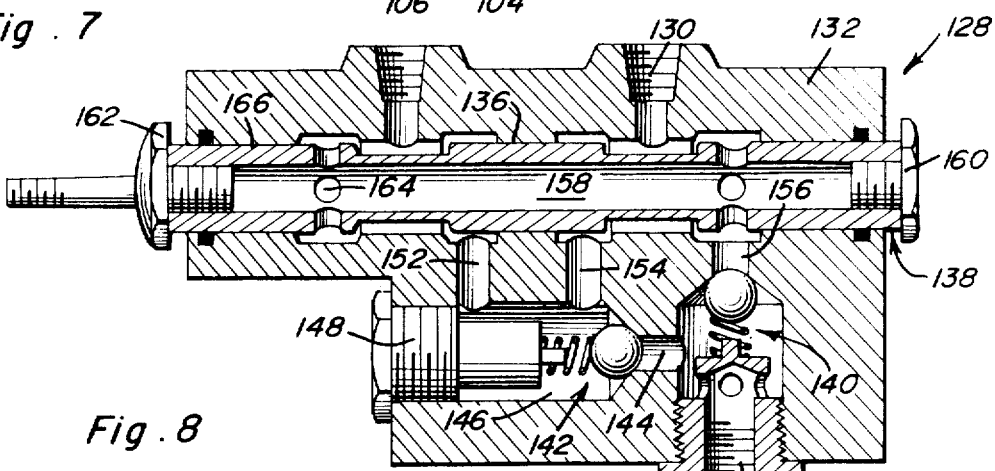
FIG. 7 is a sectional view through a fourth form of reversible differential control valve assembly.

A further reduction in the number of parts associated with the reversible differential control valve assembly is exemplified by the valve assembly 128 illustrated in FIG. 7 wherein a pair of load ports 130 are disposed on one side of the valve body 132 opposite the side through which the supply port 134 extens, as in the other valve assemblies. The load ports 130 communicate with the valve bore 136 within which the valve plunger 138 is movable while the supply port 134 is in communication with the valve chamber of a check valve assembly 140, as in the case of the valve assembly 94. However, the two oppositely directed check valve assemblies 116 as described in connection with FIG. 6, are replaced by a single check valve assembly 140 and the valve chamber 146 of check valve assembly 142. The check valve assembly 142 is biased to its closed position by a spring seated on a projection extending from a threaded plug 148 closing the valve chamber 146 with which a pair of passages 154 and 152 are in communication. The passages 152 and 154 conduct flow of fluid between the valve chamber 146 and the valve cavities in valve bore 136 axially spaced by the intermediate land 155 of the valve plunger 138. Also, a passage 156 conducts flow of fluid between the valve chamber of check valve assembly 140 and the right hand valve cavity of valve bore 136 as seen in FIG. 7.

The valve plunger 138 is similar in external shape to the valve plungers associated with the previously described valve assemblies. However, the valve plunger 138 is provided with an internal bore passage 158 closed at opposite axial ends by threaded plugs associated with the stop elements 160 and 162. Fluid communication is established between the internal passage 158 and the two outboard axially spaced valve cavities of valve bore 136 by means of a plurality of circumferentially spaced openings 164 extending through the axial end portions 166 of the valve plunger. A flow path is thereby established between the load ports in the neutral position of the valve plunger 138 as in the case of the valve assembly 94 illustrated in FIG. 6.

It will be apparent that the reversible differential control valve assembly 128 illustrated in FIG. 7 in addition to utilizing a common passage 56 through which flow toward the supply port 134 is conducted as in the case of valve assembly 94, replaces the two oppositely directed check valve assembly 116 of the valve assembly 94 with a single check valve assembly 142, through which flow is conducted from the supply port 134 to both of the load ports 130 via conduits 152 and 154 when the valve plunger 138 is in the neutral position illustrated. Axial shift of the valve plunger to one load compensating position or the other, will cause its land 155 to block flow through one of the passages 152 and 154 to one of the load ports 130 while cross-flow in one direction past check valve 140 will be conducted from the blocked port 130 to said one load port. Bi-directional cross-flow between the load ports 130 is conducted through the internal passage 158 in the valve plunger and the openings 164 in the neutral position of the valve plunger.

Figure 8:
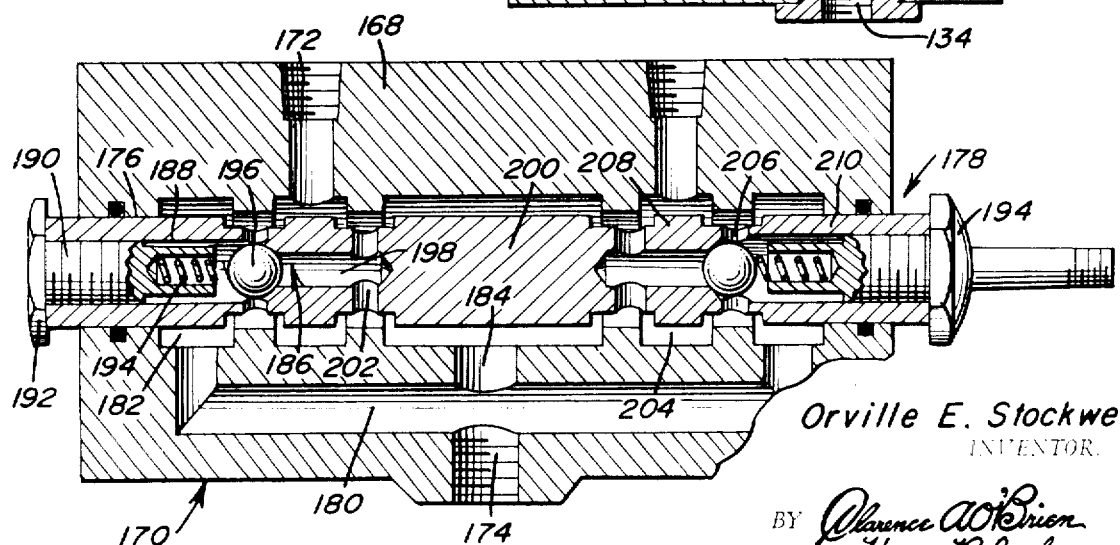
FIG. 8 is a sectional view through a fifth form of reversible differential control valve assembly in accordance with the present invention.

A further structural simplification is effected with respect to the valve body 168 of the reversible differential control valve assembly 170 illustrated in FIG. 8. The valve body 168 is provided with a pair of load ports 172 on one side thereof opposite the side provided with the single supply port 174 as in the case of the valve body 32' of the valve assembly 10' illustrated in FIG. 5. The load ports 172 are in fluid communication with the valve bore 176 cooperating with a valve plunger 178 as in the case of the valve assembly 94 illustrated in FIG. 6 so that bi-directional cross-flow is established between the load ports in the neutral position of the valve plunger. In the neutral position of the valve plunger 178, fluid communication is also established between both of the load ports 172 and th supply port 174 through a connecting passage 180 and valve cavities 182 adjacent the opposite axial ends of the valve plunger and a valve cavity 184 intermediate the other two valve cavities 182. Thus, bi-directional cross-flow may occur between the ports in the neutral position of the valve plunger 178 without any opening of check valves as in the case of the valve assemblies illustrated in FIGS. 6 and 7.

The reversible differential control valve assembly 170 features a pair of oppositely directed check valve assemblies 186 mounted within the valve plunger 178 itself. Accordingly, the valve plunger is provided with axially spaced bores 188 at the opposite axial ends thereof closed by the externally threaded plug portions 190 associated with the stop elements 192 and 194. The plugs are provided with retainer sockets at the inner ends thereof seating springs 194 biasing the check valve elements 196 to closed positions seated at the ends of small diameter passages 198 within the valve plunger. The inner ends of the passages 198 are spaced from each other by the solid intermediate land portion 200 of the valve plunger. The passage 198 is in communication with the valve bore 176 through openings 202. It will be apparent therefore, that upon axial shift of the valve plunger 178 to one of its load compensating positions, flow of fluid in one direction from the supply port 174 to one of the load ports will be blocked by one of the check valve assemblies 186 within a valve cavity 182 at one axial end of the valve plunger while flow to the other load port will be conducted through the valve cavity 184, openings 202, one of the passages 198 past one of the check valve elements 196 and one of the valve cavities 204 to the other load port. Flow past the opened check valve element 196 into the valve cavity 204 is conducted through openings 206 disposed between the valve land portions 208 and 210 on both sides of the intermediate land portion 200. While flow of fluid in one direction from the supply port 174 to one of the load ports 172 is blocked by a check valve assembly 186, flow in the opposite direction from this port 172 to the port 174 is accommodated through an associated valve cavity 204, openings 202, passage 198 past the check valve element 196, openings 206, valve cavity 182 and connecting passage 180. Flow from this load port to the other load port is also accommodated at the same time through the valve space 184.

Because of the foregoing construction and operation of the refersible differential control valve assemblies, relying on the action of check valves to control flow along different paths for load equalization purposes in response to shift of the single valve plunger, a relatively short stroke is all that is needed in connection with the movement of the valve plunger. In view thereof, amplifying linkages are not required to transmit differential information to the valve assembly through the connector 42 associated with the valve plunger as described in connection with FIG. 4. The reversible differential control valve assemblies hereinbefore described are therefor ideally suitable to various installations through which differential load information is collected and delivered to the reversible differential contro valve assembly, with different levels of sensitivity. The reversible differential control valve assembly is therefore applicable to many different installations such as machine tools, elevating platforms, material handling equipment, side hoise and rear dump bodies on truck vehicles and earth moving equipment.

Figure 1:
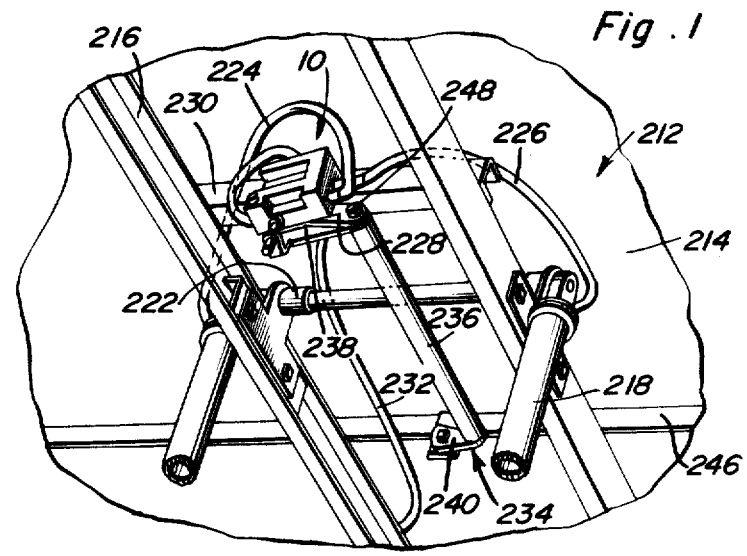
FIG. 1 is a perspective view showing a rear dump hoist installation for a fluid control system in accordance with the present invention.
Figure 2:
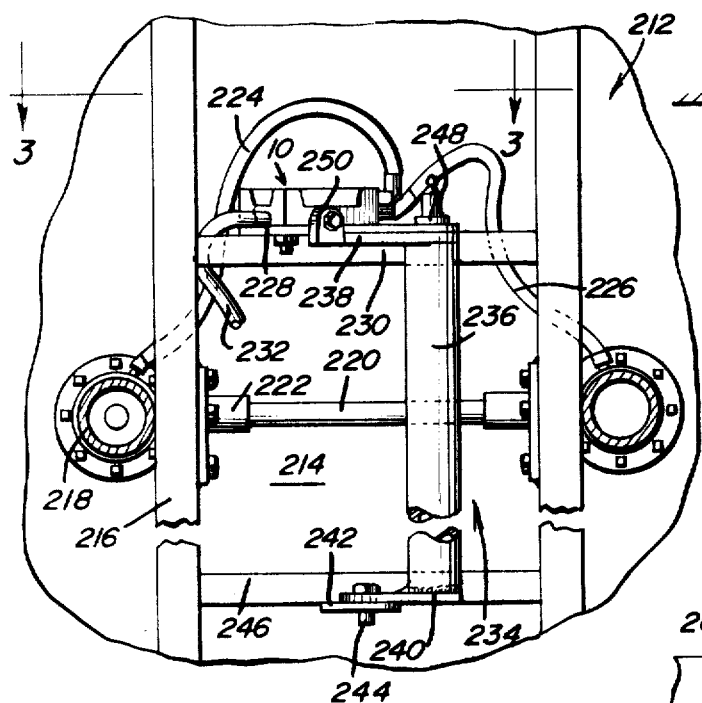
FIG. 2 is a bottom plan view of the installation shown in FIG. 1.
Figure 3:
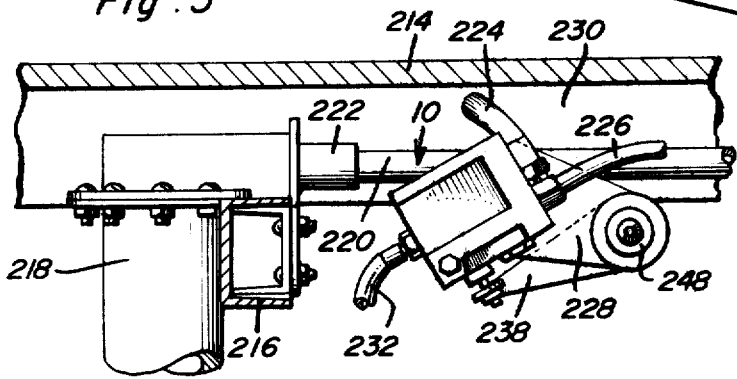
FIG. 3 is an enlarged partial sectional view taken substantially through a plane indicated by section line 3—3 in FIG. 2.

FIGS. 1, 2 and 3 illustrate a rear dump truck installation generally referred to by reference numeral 212. In this installation, a load member such as the floorboard 214 of a dump body carried on parallel spaced, beams 216, is pivotally displaced relative to the chassis frame of the vehicle to which the piston rods associated with hydraulic jack cylinder portions 218 are connected. The cylinder portions 218 are pivotally connected to the platform or load frame assembly 216-214 at two transversely separated points by bearing assemblies secured to the load frame structure. Fluid under pressure is supplied to the cylinder portions by fluid lines 224 and 226 for pivotally elevating the load member by extension of the piston rods associated with the hydraulic jacks. Lowering of the load member on the other hand is accommodated by exhaust of fluid from the cylinder portions through the fluid lines 224 and 226. Fluid under pressure is supplied to and exhausted from the lines 224 and 226 through a reversible differential control valve assembly 10 for example, the valve body of which is fixedly mounted on a mounting bracket 228. The mounting bracket 228 is fixed to a cross-beam 230 interconnecting the parallel spaced beams 216. The valve assembly 10 is thereby fixedly mounted on the load member in a position for conducting fluid under pressure to and from the cylinder portions 218 through lines 224 and 226. Fluid from a suitable source is supplied to the reversible different control valve assembly 10 by the fluid line 232 in order to effect raising and lowering of the load through the cylinder portions 218 of the hydraulic jacks as hereinbefore described in connection with FIG. 11. The control valve assembly 10 as hereinbefore explained acts to differentially restrict cylinder travel when its valve plunger is actuated in one direction or another from the neutral position by a sensing device generally referred to by reference numeral 234.

The sensing device 234 includes a torque tube 236 that is disposed generally parallel to the beams 216. An actuating arm 238 is rigidly connected to one axial end of the torque tube while an anchoring arm 240 is rigidly secured to the other axial end. The anchoring arm 240 is fixed to the load member in an angularly adjustable position by a bracket 242 and a fastener assembly 244, the bracket being secured to a cross member 246 of the load frame. The end of the torque tube opposite the anchoring arm 240 is pivotally mounted by the bearing 248 on mounting bracket 228 about the longitudinal axis of the torque tube.

It will be appreciated that any bending of the load member or distortion thereof during movement by the hydraulic jacks will result in twist or angular displacement of the plane defined by the locations at which the cylinder portions of the hydraulic jacks are connected to the load member. This will result in relative angular displacement between longitudinally spaced portions of the load member along the longitudinal axis of the torque tube 236. Thus, since the torque tube is anchored at one axial end by the anchor arm 240 to the load member and is pivotally mounted by the bracket 228 at its other axial end, by means of the pivot assembly 248, there will be some angular displacement of the arm 238 secured to the non-anchored end of the torque tube pivotally mounted on the load member. The amount of angular displacement of arm 238 or the sensitivity of the sensing device 234 may be varied by changing the axial length of the torque tube and the longitudinal spacing of the locations at which the axial ends of the torque tube are respectively anchored. The actuating arm 238 angularly displaced in response to torsional twist of the torque tube will accordingly cause shifting of the valve plunger of the valve assembly 10 engaged by the actuating flange 250 projecting from the actuating arm 238 and connected to the valve plunger connector.

Figure 12:
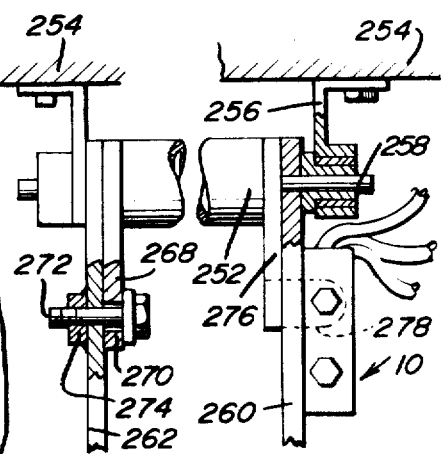
FIG. 12 is a partial top plan view with parts shown in section of a side hoist installation for the invention.
Figure 13:
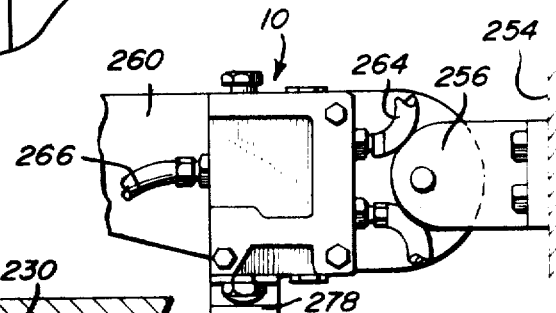
FIG. 13 is a side elevational view of the installation shown in FIG. 12.

The torque tube sensing arrangement described in connection with FIGS. 1, 2 and 3 will also be useful in connection with a side hoist installation as shown in FIGS. 12 and 13 wherein a torque tube 252 is pivotally mounted on a frame 254 by means of a pair of journal brackets 256 pivotally supported control lever arms 260 and 262 adjacent opposite axial ends of the torque tube 242, these lever arms being connected by links to the load member such as the side hoist body adapted to be pivotally displaced by the hydraulic jacks to which fluid under pressure is supplied to and exhausted from by a pair of flexible hose 264 extending from one side of the reversible differential control valve assembly 10, the hose 266 extending from the other side being connected to the source of fluid under pressure as aforementioned. The valve assembly 10 in this installation is secured to the control arm 260 for pivotal movement with torque tube 252. When even load conditions exist, both control arms 260 and 262 will be displaced by the same amount. Differential displacement of the control arms 260 and 262 will however occur as a result of any uneven condition to cause actuation of the valve plunger of valve assembly 10. Thus, the axial end of the torque tube 252 adjacent the control arm 262 is anchored in an adjusted position to the control arm 262 by means of an anchoring arm 268 having an adjustment slot 270 through which the bolt 272 extends in threaded engagement with a nut 274 welded to the control arm 262. The other axial end of the torque tube 252 is rigidly connected to an actuating arm 276 having an actuating projection 278 connected to the valve plunger of the reversible differential control valve assembly 10.

Figure 9:
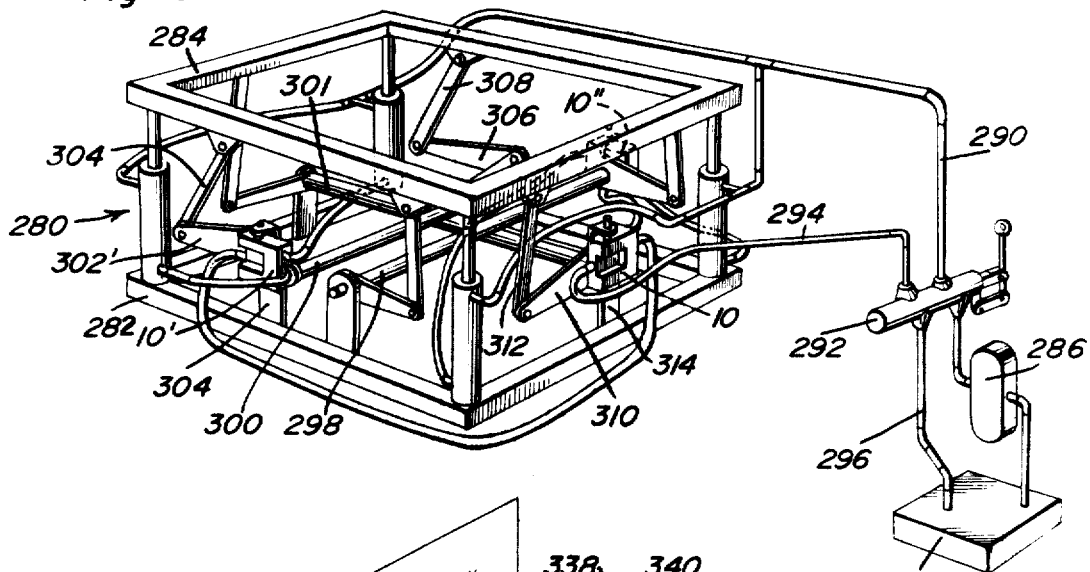
FIG. 9 is a perspective view showing a fluid control system for an elevating platform type of installation.

It will be apparent from the foregoing description of FIGS. 1, 2 and 3 on the one hand and the description of FIGS. 11 and 12 on the other hand, that different types of unequal loading may be sensed by appropriate sensing devices to supply information to the differential control valve assembly in order to produce its compensating action through differential control of 2 or more hydraulic jacks. In FIG. 9, a more complex system is illustrated wherein four corner jacks 280 anchored to a frame 282 support an elevating platform 284. Fluid under pressure is supplied to the hydraulic jacks 280 from a pressure source consisting of the pump 286 and a fluid reservoir 288. Fluid under pressure from the pump is routed to a supply line 290 through a directional control valve 292 in one position thereof while fluid under pressure is supplied to a second fluid line 294 in the other operative position of the directional control valve. Fluid is exhausted from one of the supply lines 290 and 294 through the return line 296. Thus, the hydraulic jacks 280 are of the two-way acting type with fluid being either supplied under pressure or exhausted from the opposite ends of the cylinder portions of the hydraulic jacks.

In the installation illustrated in FIG. 9, three differential control valve assemblies are utilized in association with three load sensing torque tubes 298 and 300 and 301. The fluid line 290 is directly connected to the upper ends of each of the four hydraulic jacks 280 while line 294 is connected to the supply port of valve assembly 10. The lower ends of two of the hydraulic jacks are connected to the load ports of differential control valve assemblies 10'. The supply port of valve assembly 10' is connected by line 301 to the one of the load ports of the differential control valve assembly 10. Similarly the lower ends of the other two jacks 280 are connected to the load ports of reversible differential control valve assembly 10'' having a supply port connected to the other load port of the valve assemblies 10' and 10'' are respectively associated with the torque tubes 300 and 298 in installational arrangements similar to that described with respect to FIGS. 11 and 12. For example, the control valve assembly 10' is mounted on a control arm 302 connected by link 304 to the platform 284. The control arm 302 is pivotally mounted on the frame by the bracket 306 for pivotal displacement about an axis on which the torque tube 300 is pivotally mounted. The end of the torque tube 300 adjacent the valve assembly 10' is provided with an actuating arm as hereinbefore described in connected with FIGS. 11 and 12 while the other end of the torque tube 300 is connected to the other control arm 306 which is in turn connected by the link 308 to the platform 284 in laterally spaced relation to the location at which the link 304 is connected. Thus, during lowering or elevating of the platform, if any lateral tilt of the platform occurs, this will be reflected by torsional twist of the torque tube 300 thereby actuating the control valve assembly 10' producing its compensating action on the hydraulic jacks in order to restore the platform to a level condition. The lateral tilt of the platform adjacent one end is sensed by means of the torque tube 300 while lateral tilt at the opposite end will be sensed by the torque tube 298 operating through the valve assembly 10'' in a similar fashion in order to provide a compensating effect on the operation of the associated hydraulic jacks at that end of the platform. Tilt of the platform in a direction perpendicular to the lateral tilt sensed by the torque tubes 300 and 298, will be sensed by a third torque tube 301 arm, link and valve assembly 10, transversely located relative to the other two. Thus, longitudinal tilt of the platform may be compensated for through the effect of control valve assembly 10 on each of the hydraulic jacks to which it is connected in series with one of the other two valve assemblies 10' and 10''.

Figure 10:
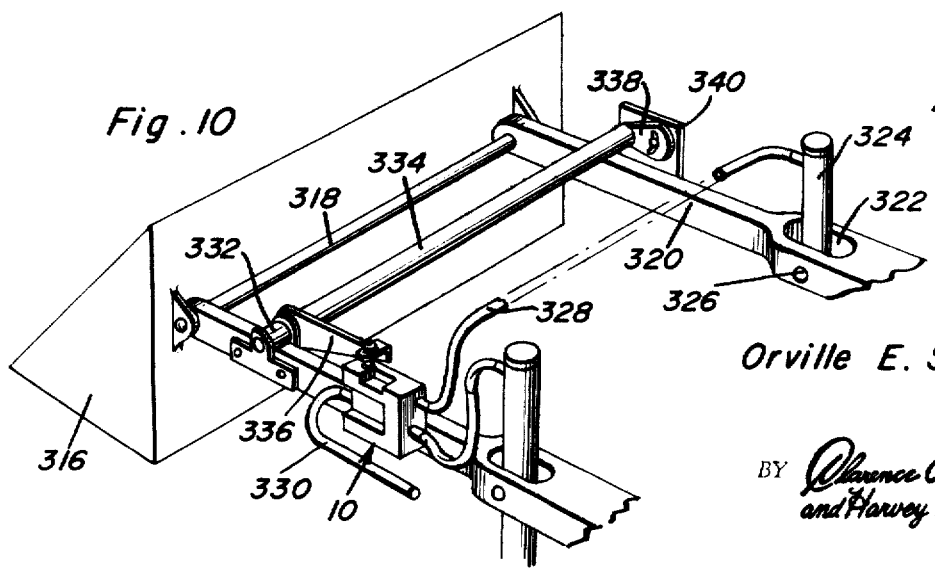
FIG. 10 is a perspective view showing yet another fluid control system for a tractor mounted loader installation.

FIG. 10 illustrates a tractor mounted loader installation in which a load bucket 316 is pivotally connected through a pivot rod 318 to the outer ends of a pair of laterally spaced positioning lever arms 320, having slots 322 through which the cylinder portions 324 of hydraulic jacks extend. Pins 326 pivotally connect the cylinder portions of the hydraulic jacks to the arms 320 so that the bucket 316 may be raised and lowered by simultaneous upward and downward pivotal displacement of the arms 320. Pivotal movement is imparted to the arms 320 by extension or retraction of the piston rods relative to the cylinder portions 324. Fluid under pressure is accordingly supplied to or exhausted from the upper ends of the cylinder portions through a pair of fluid lines 328 extending from the reversible differential control valve assembly 10 connected by the fluid line 330 to the source of fluid.

The valve body of the valve assembly 10 is fixedly secured to one of the arms 320. This same arm, fixedly mounts a bearing bracket 332 journaling one end of a torque tube 334 having an actuating arm 336 fixedly secured thereto. The other end of the torque tube had an anchor arm 338 fixed thereto, the anchor arm being fixedly mounted in an adjusted position to the other arm 320 opposite the arm on which the valve assembly 10 is mounted. Thus, any relative movement between the two arms 320 will be sensed by torsional strain of the torque tube 334 thereby actuating the valve assembly 10 through the actuating arm 336 as hereinbefore described in connection with the other installations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a source of fluid and a plurality of fluid operated devices, load means connected to said fluid operated devices, sensing means connected to the load means and valve means actuated by said sensing means for differential controlling flow of fluid in opposite directions between the source and the fluid operated devices to equalize movement thereof said valve means including a valve body, a valve element displaceable by the sensing means from a neutral position to compensating positions in which flow is blocked between the source and one of the fluid operated devices, passage means in the valve body conducting fluid through different flow paths intersected by the valve element to differentially restrict flow in response to actuation by the sensing means and unidirectional flow blocking means mounted in said passage means for selecting the flow paths through which fluid is conducted in response to displacement of the valve element from said neutral position whereby cross flow between the fluid operated devices occurs to enhance equalizing movement.

2. The combination of claim 1 wherein said passage means includes a pair of load ports connected to the fluid operated devices, a supply port and parallel flow conduit portions respectively conducting flow in opposite directions between the supply port and each of the load ports, and a directional control valve connecting the supply port to the source of fluid.

3. The combination of claim 2 wherein said flow blocking means includes pressure responsive check valves blocking flow in opposite directions through said parallel conduit portions.

4. The combination of claim 3 wherein flow to and from each of the load ports is respectively conducted by two of the parallel conduit portions.

5. The combination of claim 3 wherein flow in one direction is conducted through only one of the parallel conduit portions.

6. The combination of claim 5 wherein a single one of the check valves blocks flow through two of said parallel conduit portions.

7. The combination of claim 6 wherein said check valves are mounted within the valve element.

8. The combination of claim 3 wherein a single one of the check valves blocks flow through two of said parallel conduit portions.

9. The combination of claim 3 wherein said check valves are mounted within the valve element.

10. The combination of claim 1 wherein said sensing means includes an elongated torque tube, anchoring means connecting the torque tube at one end to the load means, and actuating means connected to the other end of the torque tube for engagement with the valve element.

11. The combination of claim 10 wherein the load means comprises a frame, a movable member pivotally mounted on the frame and means connecting the fluid operated devices to the member.

12. The combination of claim 11 including bracket means fixedly mounting the valve body on the member and pivotally mounting the torque tube adjacent thereto at said other end, said one end of the torque tube being fixedly anchored by the anchoring means to the member, said torque tube extending transversely between the fluid operated devices.

13. The combination of claim 11 wherein said connecting means comprises a pair of operating lever arms.

14. The combination of claim 13 including bracket means fixedly mounting the valve body on one of the lever arms and pivotally mounting the torque tube adjacent thereto at said other end, said one end of the torque tube being fixedly anchored by the anchoring means to the other of the lever arms.

15. The combination of claim 1 wherein the load means includes a frame to which the fluid operated devices are anchored, and a platform supported by the fluid operated devices.

16. The combination of claim 15 wherein said sensing means includes actuating means pivotally mounted on the frame and engageable with the valve for detecting movement of the platform.

17. The combination of claim 16 including additional valve means interconnecting with the source of fluid through said first mentioned valve means for detecting unequal displacement of the platform by the fluid operated devices.

18. The combination of claim 17 including an elongated torque tube pivotally mounted by the frame at opposite ends, link means connecting the torque tube at said ends to the platform, the valve element associated with said additional valve means being engageable by the link means at one of said ends of the torque tube.

19. In combination, a frame, a load member movably mounted on the frame, a plurality of fluid operated devices anchored to the frame, means interconnecting the load member with the fluid operated devices at spaced locations, a source of fluid under pressure, directional control means connecting the source to the fluid operated devices for imparting movement to the load member in opposite directions, means connected to the load member for sensing unequal movement of the fluid operated devices during movement of the load member, valve means connected to said fluid operated device for differentially restricting flow between the directional control means and the fluid operated devices in response to engagement by the sensing means to compensate for said unequal loading, passage means connected to the valve means for conducting said flow in opposite directions along different flow paths, and unidirectional flow blocking means responsive to said unequal movement of the fluid operated devices for conducting cross flow therebetween along selected ones of said flow paths.

20. The combination of claim 19 wherein said sensing means includes a torque tube connected to the load member, and actuating means displaceable by the torque tube into engagement with the valve means.

21. The combination of claim 19 wherein said valve means includes a valve body, a valve element displaceable by the sensing means from a neutral position to compensating positions blocking flow between the directional control means and one of the fluid operated devices.

22. In combination with a pair of fluid operated devices, a source of working fluid and means for sensing unequal loading of the fluid operated devices, a control valve assembly comprising a valve block having a pair of load ports connected to said fluid operated devices and a supply port connected to said source, a single valve element connected to the sensing means, means mounting the valve element within the valve block for displacement from a neutral position by the sensing means to differentially restrict flow of the working fluid between the supply port and said pair of load ports, passage means mounted within the valve block for conducting flow of the working fluid in opposite directions between the supply and load ports along separate and different flow paths, and pressure responsive check valve means mounted in the passage means for unidirectionally conducting cross flow between said load ports in response to unequal loading of the fluid operated devices.

* * * * *